(12) United States Patent
Carlisle et al.

(10) Patent No.: US 6,822,797 B1
(45) Date of Patent: Nov. 23, 2004

(54) LIGHT MODULATOR STRUCTURE FOR PRODUCING HIGH-CONTRAST OPERATION USING ZERO-ORDER LIGHT

(75) Inventors: Clinton B. Carlisle, Palo Alto, CA (US); Jahia I. Trisnadi, Cupertino, CA (US); James Hunter, Campbell, CA (US)

(73) Assignee: Silicon Light Machines, Inc., Sunnyvale, CA (US)

( * ) Notice: Subject to any disclaimer, the term of this patent is extended or adjusted under 35 U.S.C. 154(b) by 196 days.

(21) Appl. No.: 10/159,715

(22) Filed: May 31, 2002

(51) Int. Cl.[7] .................................................. G02B 5/18
(52) U.S. Cl. ...................... 359/572; 359/573; 359/569; 359/247; 359/254
(58) Field of Search ............................... 359/572, 573, 359/569, 566, 245, 247, 254, 255

(56) References Cited

U.S. PATENT DOCUMENTS

| | | |
|---|---|---|
| 1,525,550 A | 2/1925 | Jenkins |
| 1,548,262 A | 8/1925 | Freedman |
| RE16,767 E | 10/1927 | Jenkins |
| 1,814,701 A | 7/1931 | Ives |
| 2,415,226 A | 2/1947 | Sziklai |
| 2,783,406 A | 2/1957 | Vanderhooft |
| 2,920,529 A | 1/1960 | Blythe |
| 2,991,690 A | 7/1961 | Grey et al. |
| RE25,169 E | 5/1962 | Glenn |
| 3,256,465 A | 6/1966 | Weissenstern et al. |
| 3,388,301 A | 6/1968 | James |
| 3,443,871 A | 5/1969 | Chitayat |
| 3,553,364 A | 1/1971 | Lee |
| 3,576,394 A | 4/1971 | Lee |
| 3,600,798 A | 8/1971 | Lee |
| 3,656,837 A | 4/1972 | Sandbank |
| 3,657,610 A | 4/1972 | Yamamoto et al. |
| 3,693,239 A | 9/1972 | Dix |
| 3,743,507 A | 7/1973 | Ih et al. |
| 3,752,563 A | 8/1973 | Torok et al. |
| 3,781,465 A | 12/1973 | Emstoff et al. |
| 3,783,184 A | 1/1974 | Emstoff et al. |
| 3,792,916 A | 2/1974 | Sama |
| 3,802,769 A | 4/1974 | Rotz et al. |

(List continued on next page.)

FOREIGN PATENT DOCUMENTS

| | | |
|---|---|---|
| DE | 197 51 716 A1 | 5/1998 |
| EP | 0 089 044 A2 | 9/1983 |

(List continued on next page.)

OTHER PUBLICATIONS

"Development of Digital MEMS–Based Display Technology Promises Improved Resolution, Contrast, And Speed", XP–000730009, 1997, p. 33.

(List continued on next page.)

Primary Examiner—Drew A. Dunn
Assistant Examiner—Fayez Assaf
(74) Attorney, Agent, or Firm—Okamoto & Benedicto LLP (57) ABSTRACT

An optical system provides high-contrast operation by collecting zero order light. The optical system comprises a light modulator and a collector. The light modulator is preferably a grating light valve™ light modulator including a plurality of elements selectively operable in a first mode and a second mode, wherein a gap between adjacent elements is equal to or less than a wavelength of an incident light beam. The plurality of elements in the first mode reflect light along a return path, where the plurality of elements in the second mode direct light away from the return path. The collector is coupled to the light modulator to collect zero order light along the return path while the plurality of elements are in the first mode and to collect zero order light along the return path while the plurality of elements are in the second mode.

18 Claims, 4 Drawing Sheets

U.S. PATENT DOCUMENTS

| | | |
|---|---|---|
| 3,811,186 A | 5/1974 | Larnerdf et al. |
| 3,861,784 A | 1/1975 | Torok |
| 3,862,360 A | 1/1975 | Dill et al. |
| 3,871,014 A | 3/1975 | King et al. |
| 3,886,310 A | 5/1975 | Guldberg et al. |
| 3,896,338 A | 7/1975 | Nathanson et al. |
| 3,915,548 A | 10/1975 | Opittek |
| 3,935,499 A | 1/1976 | Oess |
| 3,935,500 A | 1/1976 | Oess et al. |
| 3,938,881 A | 2/1976 | Biegelsen et al. |
| 3,941,456 A | 3/1976 | Schilz et al. |
| 3,942,245 A | 3/1976 | Jackson et al. |
| 3,943,281 A | 3/1976 | Keller et al. |
| 3,947,105 A | 3/1976 | Smith |
| 3,969,611 A | 7/1976 | Fonteneau |
| 3,980,476 A | 9/1976 | Wysocki |
| 3,991,416 A | 11/1976 | Byles et al. |
| 4,001,663 A | 1/1977 | Bray |
| 4,004,849 A | 1/1977 | Shattuck |
| 4,006,968 A | 2/1977 | Ernstoff et al. |
| 4,009,939 A | 3/1977 | Okano |
| 4,011,009 A | 3/1977 | Lama et al. |
| 4,012,116 A | 3/1977 | Yevick |
| 4,012,835 A | 3/1977 | Wallick |
| 4,017,158 A | 4/1977 | Booth |
| 4,020,381 A | 4/1977 | Oess et al. |
| 4,021,766 A | 5/1977 | Aine |
| 4,034,211 A | 7/1977 | Horst et al. |
| 4,034,399 A | 7/1977 | Drukier et al. |
| 4,035,068 A | 7/1977 | Rawson |
| 4,067,129 A | 1/1978 | Abramson et al. |
| 4,084,437 A | 4/1978 | Finnegan |
| 4,090,219 A | 5/1978 | Ernstoff et al. |
| 4,093,346 A | 6/1978 | Nishino et al. |
| 4,093,921 A | 6/1978 | Buss |
| 4,093,922 A | 6/1978 | Buss |
| 4,100,579 A | 7/1978 | Ernstoff |
| 4,103,273 A | 7/1978 | Keller |
| 4,126,380 A | 11/1978 | Borm |
| 4,127,322 A | 11/1978 | Jacobson et al. |
| 4,135,502 A | 1/1979 | Peck |
| 4,139,257 A | 2/1979 | Matsumoto |
| 4,143,943 A | 3/1979 | Rawson |
| 4,163,570 A | 8/1979 | Greenaway |
| 4,184,700 A | 1/1980 | Greenaway |
| 4,185,891 A | 1/1980 | Kaestner |
| 4,190,855 A | 2/1980 | Inoue |
| 4,195,915 A | 4/1980 | Lichty et al. |
| 4,205,428 A | 6/1980 | Ernstoff et al. |
| 4,211,918 A | 7/1980 | Nyfeler et al. |
| 4,223,050 A | 9/1980 | Nyfeler et al. |
| 4,225,913 A | 9/1980 | Bray |
| 4,249,796 A | 2/1981 | Sincerbox et al. |
| 4,250,217 A | 2/1981 | Greenaway |
| 4,250,393 A | 2/1981 | Greenaway |
| 4,256,787 A | 3/1981 | Shaver et al. |
| 4,257,016 A | 3/1981 | Kramer, Jr. et al. |
| 4,257,053 A | 3/1981 | Gilbreath |
| 4,290,672 A | 9/1981 | Whitefield |
| 4,295,145 A | 10/1981 | Latta |
| 4,311,999 A | 1/1982 | Upton et al. |
| 4,327,411 A | 4/1982 | Turner |
| 4,327,966 A | 5/1982 | Bloom |
| 4,331,972 A | 5/1982 | Rajchman |
| 4,336,982 A | 6/1982 | Rector, Jr. |
| 4,338,660 A | 7/1982 | Kelley et al. |
| 4,343,535 A | 8/1982 | Bleha, Jr. |
| 4,346,965 A | 8/1982 | Sprague et al. |
| 4,348,079 A | 9/1982 | Johnson |
| 4,355,463 A | 10/1982 | Burns |
| 4,361,384 A | 11/1982 | Bosserman |
| 4,369,524 A | 1/1983 | Rawson et al. |
| 4,374,397 A | 2/1983 | Mir |
| 4,389,096 A | 6/1983 | Hori et al. |
| 4,391,490 A | 7/1983 | Hartke |
| 4,396,246 A | 8/1983 | Holman |
| 4,398,798 A | 8/1983 | Krawczak et al. |
| 4,400,740 A | 8/1983 | Traino et al. |
| 4,408,884 A | 10/1983 | Kleinknecht et al. |
| 4,414,583 A | 11/1983 | Hooker, III |
| 4,417,386 A | 11/1983 | Exner |
| 4,418,397 A | 11/1983 | Brantingham et al. |
| 4,420,717 A | 12/1983 | Wallace et al. |
| 4,422,099 A | 12/1983 | Wolfe |
| 4,426,768 A | 1/1984 | Black et al. |
| 4,430,584 A | 2/1984 | Someshwar et al. |
| 4,435,041 A | 3/1984 | Torok et al. |
| 4,440,839 A | 4/1984 | Mottier |
| 4,443,819 A | 4/1984 | Funada et al. |
| 4,443,845 A | 4/1984 | Hamilton et al. |
| 4,447,881 A | 5/1984 | Brantingham et al. |
| 4,454,591 A | 6/1984 | Lou |
| 4,456,338 A | 6/1984 | Gelbart |
| 4,460,907 A | 7/1984 | Nelson |
| 4,462,046 A | 7/1984 | Spight |
| 4,467,342 A | 8/1984 | Tower |
| 4,468,725 A | 8/1984 | Venturini |
| 4,483,596 A | 11/1984 | Marshall |
| 4,484,188 A | 11/1984 | Ott |
| 4,487,677 A | 12/1984 | Murphy |
| 4,492,435 A | 1/1985 | Banton et al. |
| 4,503,494 A | 3/1985 | Hamilton et al. |
| 4,511,220 A | 4/1985 | Scully |
| 4,538,883 A | 9/1985 | Sprague et al. |
| 4,545,610 A | 10/1985 | Lakritz et al. |
| 4,556,378 A | 12/1985 | Nyfeler et al. |
| 4,558,171 A | 12/1985 | Gantley et al. |
| 4,561,011 A | 12/1985 | Kohara et al. |
| 4,561,044 A | 12/1985 | Ogura et al. |
| 4,566,935 A | 1/1986 | Hornbeck |
| 4,567,585 A | 1/1986 | Gelbart |
| 4,571,041 A | 2/1986 | Gaudyn |
| 4,571,603 A | 2/1986 | Hornbeck et al. |
| 4,577,932 A | 3/1986 | Gelbart |
| 4,577,933 A | 3/1986 | Yip et al. |
| 4,588,957 A | 5/1986 | Balant et al. |
| 4,590,548 A | 5/1986 | Maytum |
| 4,594,501 A | 6/1986 | Culley et al. |
| 4,596,992 A | 6/1986 | Hornbeck |
| 4,615,595 A | 10/1986 | Hornbeck |
| 4,623,219 A | 11/1986 | Trias |
| 4,636,039 A | 1/1987 | Turner |
| 4,636,866 A | 1/1987 | Hattori |
| 4,641,193 A | 2/1987 | Glenn |
| 4,645,881 A | 2/1987 | LeToumelin et al. |
| 4,646,158 A | 2/1987 | Ohno et al. |
| 4,649,085 A | 3/1987 | Landram |
| 4,649,432 A | 3/1987 | Watanabe et al. |
| 4,652,932 A | 3/1987 | Miyajima et al. |
| 4,655,539 A | 4/1987 | Caulfield et al. |
| 4,660,938 A | 4/1987 | Kazan |
| 4,661,828 A | 4/1987 | Miller, Jr. et al. |
| 4,662,746 A | 5/1987 | Hornbeck |
| 4,663,670 A | 5/1987 | Ito et al. |
| 4,687,326 A | 8/1987 | Corby, Jr. |
| 4,698,602 A | 10/1987 | Armitage |
| 4,700,276 A | 10/1987 | Freyman et al. |
| 4,707,064 A | 11/1987 | Dobrowolski et al. |
| 4,709,995 A | 12/1987 | Kuribayashi et al. |
| 4,710,732 A | 12/1987 | Hornbeck |
| 4,711,526 A | 12/1987 | Hennings et al. |

| | | | | | |
|---|---|---|---|---|---|
| 4,714,326 A | 12/1987 | Usui et al. | 5,028,939 A | 7/1991 | Hornbeck et al. |
| 4,717,066 A | 1/1988 | Goldenberg et al. | 5,035,473 A | 7/1991 | Kuwayama et al. |
| 4,719,507 A | 1/1988 | Bos | 5,037,173 A | 8/1991 | Sampsell et al. |
| 4,721,629 A | 1/1988 | Sakai et al. | 5,039,628 A | 8/1991 | Carey |
| 4,722,593 A | 2/1988 | Shimazaki | 5,040,052 A | 8/1991 | McDavid |
| 4,724,467 A | 2/1988 | Yip et al. | 5,041,395 A | 8/1991 | Steffen |
| 4,728,185 A | 3/1988 | Thomas | 5,041,851 A | 8/1991 | Nelson |
| 4,743,091 A | 5/1988 | Gelbart | 5,043,917 A | 8/1991 | Okamoto |
| 4,744,633 A | 5/1988 | Sheiman | 5,048,077 A | 9/1991 | Wells et al. |
| 4,747,671 A | 5/1988 | Takahashi et al. | 5,049,901 A | 9/1991 | Gelbart |
| 4,751,509 A | 6/1988 | Kubota et al. | 5,058,992 A | 10/1991 | Takahashi |
| 4,761,253 A | 8/1988 | Antes | 5,060,058 A | 10/1991 | Goldenberg et al. |
| 4,763,975 A | 8/1988 | Scifres et al. | 5,061,049 A | 10/1991 | Hornbeck |
| 4,765,865 A | 8/1988 | Gealer et al. | 5,066,614 A | 11/1991 | Dunaway et al. |
| 4,772,094 A | 9/1988 | Sheiman | 5,068,205 A | 11/1991 | Baxter et al. |
| 4,797,694 A | 1/1989 | Agostinelli et al. | 5,072,239 A | 12/1991 | Mitcham et al. |
| 4,797,918 A | 1/1989 | Lee et al. | 5,072,418 A | 12/1991 | Boutaud et al. |
| 4,801,194 A | 1/1989 | Agostinelli et al. | 5,074,947 A | 12/1991 | Estes et al. |
| 4,803,560 A | 2/1989 | Matsunaga et al. | 5,075,940 A | 12/1991 | Kuriyama et al. |
| 4,804,641 A | 2/1989 | Arlt et al. | 5,079,544 A | 1/1992 | DeMond et al. |
| 4,807,021 A | 2/1989 | Okumura | 5,081,617 A | 1/1992 | Gelbart |
| 4,807,965 A | 2/1989 | Garakani | 5,083,857 A | 1/1992 | Hornbeck |
| 4,809,078 A | 2/1989 | Yabe et al. | 5,085,497 A | 2/1992 | Um et al. |
| 4,811,082 A | 3/1989 | Jacobs et al. | 5,089,903 A | 2/1992 | Kuwayama et al. |
| 4,811,210 A | 3/1989 | McAulay | 5,093,281 A | 3/1992 | Eshima |
| 4,814,759 A | 3/1989 | Gombrich et al. | 5,096,279 A | 3/1992 | Hornbeck et al. |
| 4,817,850 A | 4/1989 | Wiener-Avnear et al. | 5,099,353 A | 3/1992 | Hornbeck |
| 4,824,200 A | 4/1989 | Isono et al. | 5,101,184 A | 3/1992 | Antes |
| 4,827,391 A | 5/1989 | Sills | 5,101,236 A | 3/1992 | Nelson et al. |
| 4,829,365 A | 5/1989 | Eichenlaub | 5,103,334 A | 4/1992 | Swanberg |
| 4,836,649 A | 6/1989 | Ledebuhr et al. | 5,105,207 A | 4/1992 | Nelson |
| 4,856,863 A | 8/1989 | Sampsell et al. | 5,105,299 A | 4/1992 | Anderson et al. |
| 4,856,869 A | 8/1989 | Sakata et al. | 5,105,369 A | 4/1992 | Nelson |
| 4,859,012 A | 8/1989 | Cohn | 5,107,372 A | 4/1992 | Gelbart et al. |
| 4,859,060 A | 8/1989 | Katagiri et al. | 5,112,436 A | 5/1992 | Bol |
| 4,866,488 A | 9/1989 | Frensley | 5,113,272 A | 5/1992 | Reamey |
| 4,882,683 A | 11/1989 | Rupp et al. | 5,113,285 A | 5/1992 | Franklin et al. |
| 4,893,509 A | 1/1990 | MacIver et al. | 5,115,344 A | 5/1992 | Jaskie |
| 4,896,325 A | 1/1990 | Coldren | 5,119,204 A | 6/1992 | Hashimoto et al. |
| 4,896,948 A | 1/1990 | Dono et al. | 5,121,343 A | 6/1992 | Faris |
| 4,897,708 A | 1/1990 | Clements | 5,126,812 A | 6/1992 | Greiff |
| 4,902,083 A | 2/1990 | Wells | 5,126,826 A | 6/1992 | Kauchi et al. |
| 4,915,463 A | 4/1990 | Barbee, Jr. | 5,126,836 A | 6/1992 | Um |
| 4,915,479 A | 4/1990 | Clarke | 5,128,660 A | 7/1992 | DeMond et al. |
| 4,924,413 A | 5/1990 | Suwannukul | 5,129,716 A | 7/1992 | Holakovszky et al. |
| 4,926,241 A | 5/1990 | Carey | 5,132,723 A | 7/1992 | Gelbart |
| 4,930,043 A | 5/1990 | Wiegand | 5,132,812 A | 7/1992 | Takahashi et al. |
| 4,934,773 A | 6/1990 | Becker | 5,136,695 A | 8/1992 | Goldshlag et al. |
| 4,940,309 A | 7/1990 | Baum | 5,137,836 A | 8/1992 | Lam |
| 4,943,815 A | 7/1990 | Aldrich et al. | 5,142,303 A | 8/1992 | Nelson |
| 4,945,773 A | 8/1990 | Sickafus | 5,142,405 A | 8/1992 | Hornbeck |
| 4,949,148 A | 8/1990 | Bartelink | 5,142,677 A | 8/1992 | Ehlig et al. |
| 4,950,890 A | 8/1990 | Gelbart | 5,144,472 A | 9/1992 | Sang, Jr. et al. |
| 4,952,925 A | 8/1990 | Haastert | 5,147,815 A | 9/1992 | Casto |
| 4,954,789 A | 9/1990 | Sampsell | 5,148,157 A | 9/1992 | Florence |
| 4,956,619 A | 9/1990 | Hornbeck | 5,148,506 A | 9/1992 | McDonald |
| 4,961,633 A | 10/1990 | Ibrahim et al. | 5,149,405 A | 9/1992 | Bruns et al. |
| 4,963,012 A | 10/1990 | Tracy et al. | 5,150,205 A | 9/1992 | Um et al. |
| 4,970,575 A | 11/1990 | Soga et al. | 5,151,718 A | 9/1992 | Nelson |
| 4,978,202 A | 12/1990 | Yang | 5,151,724 A | 9/1992 | Kikinis |
| 4,982,184 A | 1/1991 | Kirkwood | 5,151,763 A | 9/1992 | Marek et al. |
| 4,982,265 A | 1/1991 | Watanabe et al. | 5,153,770 A | 10/1992 | Harris |
| 4,984,824 A | 1/1991 | Antes et al. | 5,155,604 A | 10/1992 | Miekka et al. |
| 4,999,308 A | 3/1991 | Nishiura et al. | 5,155,615 A | 10/1992 | Tagawa |
| 5,003,300 A | 3/1991 | Wells | 5,155,778 A | 10/1992 | Magel et al. |
| 5,009,473 A | 4/1991 | Hunter et al. | 5,155,812 A | 10/1992 | Ehlig et al. |
| 5,013,141 A | 5/1991 | Sakata | 5,157,304 A | 10/1992 | Kane et al. |
| 5,018,256 A | 5/1991 | Hornbeck | 5,159,485 A | 10/1992 | Nelson |
| 5,022,750 A | 6/1991 | Flasck | 5,161,042 A | 11/1992 | Hamada |
| 5,023,905 A | 6/1991 | Wells et al. | 5,162,787 A | 11/1992 | Thompson et al. |
| 5,024,494 A | 6/1991 | Williams et al. | 5,164,019 A | 11/1992 | Sinton |

| | | | | | | |
|---|---|---|---|---|---|---|
| 5,165,013 A | 11/1992 | Faris | | 5,272,473 A | 12/1993 | Thompson et al. |
| 5,168,401 A | 12/1992 | Endriz | | 5,278,652 A | 1/1994 | Urbanus et al. |
| 5,168,406 A | 12/1992 | Nelson | | 5,278,925 A | 1/1994 | Boysel et al. |
| 5,170,156 A | 12/1992 | DeMond et al. | | 5,280,277 A | 1/1994 | Hornbeck |
| 5,170,269 A | 12/1992 | Lin et al. | | 5,281,887 A | 1/1994 | Engle |
| 5,170,283 A | 12/1992 | O'Brien et al. | | 5,281,957 A | 1/1994 | Schoolman |
| 5,172,161 A | 12/1992 | Nelson | | 5,285,105 A | 2/1994 | Cain |
| 5,172,262 A | 12/1992 | Hornbeck | | 5,285,196 A | 2/1994 | Gale, Jr. |
| 5,177,724 A | 1/1993 | Gelbart | | 5,285,407 A | 2/1994 | Gale et al. |
| 5,178,728 A | 1/1993 | Boysel et al. | | 5,287,096 A | 2/1994 | Thompson et al. |
| 5,179,274 A | 1/1993 | Sampsell | | 5,287,215 A | 2/1994 | Warde et al. |
| 5,179,367 A | 1/1993 | Shimizu | | 5,289,172 A | 2/1994 | Gale, Jr. et al. |
| 5,181,231 A | 1/1993 | Parikh et al. | | 5,291,317 A | 3/1994 | Newswanger |
| 5,182,665 A | 1/1993 | O'Callaghan et al. | | 5,291,473 A | 3/1994 | Pauli |
| 5,185,660 A | 2/1993 | Um | | 5,293,511 A | 3/1994 | Poradish et al. |
| 5,188,280 A | 2/1993 | Nakao et al. | | 5,296,408 A | 3/1994 | Wilbarg et al. |
| 5,189,404 A | 2/1993 | Masimo et al. | | 5,296,891 A | 3/1994 | Vogt et al. |
| 5,189,505 A | 2/1993 | Bartelink | | 5,296,950 A | 3/1994 | Lin et al. |
| 5,191,405 A | 3/1993 | Tomita et al. | | 5,298,460 A | 3/1994 | Nishiguchi et al. |
| 5,192,864 A | 3/1993 | McEwen et al. | | 5,299,037 A | 3/1994 | Sakata |
| 5,192,946 A | 3/1993 | Thompson et al. | | 5,299,289 A | 3/1994 | Omae et al. |
| 5,198,895 A | 3/1993 | Vick | | 5,300,813 A | 4/1994 | Joshi et al. |
| D334,557 S | 4/1993 | Hunter et al. | | 5,301,062 A | 4/1994 | Takahashi et al. |
| D334,742 S | 4/1993 | Hunter et al. | | 5,303,043 A | 4/1994 | Glenn |
| 5,202,785 A | 4/1993 | Nelson | | 5,303,055 A | 4/1994 | Hendrix et al. |
| 5,206,629 A | 4/1993 | DeMond et al. | | 5,307,056 A | 4/1994 | Urbanus |
| 5,208,818 A | 5/1993 | Gelbart et al. | | 5,307,185 A | 4/1994 | Jones et al. |
| 5,208,891 A | 5/1993 | Prysner | | 5,310,624 A | 5/1994 | Ehrlich |
| 5,210,637 A | 5/1993 | Puzey | | 5,311,349 A | 5/1994 | Anderson et al. |
| 5,212,115 A | 5/1993 | Cho et al. | | 5,311,360 A | 5/1994 | Bloom et al. |
| 5,212,555 A | 5/1993 | Stoltz | | 5,312,513 A | 5/1994 | Florence et al. |
| 5,212,582 A | 5/1993 | Nelson | | 5,313,479 A | 5/1994 | Florence |
| 5,214,308 A | 5/1993 | Nishiguchi et al. | | 5,313,648 A | 5/1994 | Ehlig et al. |
| 5,214,419 A | 5/1993 | DeMond et al. | | 5,313,835 A | 5/1994 | Dunn |
| 5,214,420 A | 5/1993 | Thompson et al. | | 5,315,418 A | 5/1994 | Sprague et al. |
| 5,216,278 A | 6/1993 | Lin et al. | | 5,315,423 A | 5/1994 | Hong |
| 5,216,537 A | 6/1993 | Hornbeck | | 5,315,429 A | 5/1994 | Abramov |
| 5,216,544 A | 6/1993 | Horikawa et al. | | 5,319,214 A | 6/1994 | Gregory et al. |
| 5,219,794 A | 6/1993 | Satoh et al. | | 5,319,789 A | 6/1994 | Ehlig et al. |
| 5,220,200 A | 6/1993 | Blanton | | 5,319,792 A | 6/1994 | Ehlig et al. |
| 5,221,400 A | 6/1993 | Staller et al. | | 5,320,709 A | 6/1994 | Bowden et al. |
| 5,221,982 A | 6/1993 | Faris | | 5,321,416 A | 6/1994 | Bassett et al. |
| 5,224,088 A | 6/1993 | Atiya | | 5,323,002 A | 6/1994 | Sampsell et al. |
| D337,320 S | 7/1993 | Hunter et al. | | 5,323,051 A | 6/1994 | Adams et al. |
| 5,226,099 A | 7/1993 | Mignardi et al. | | 5,325,116 A | 6/1994 | Sampsell |
| 5,229,597 A | 7/1993 | Fukatsu | | 5,327,286 A | 7/1994 | Sampsell et al. |
| 5,230,005 A | 7/1993 | Rubino et al. | | 5,329,289 A | 7/1994 | Sakamoto et al. |
| 5,231,363 A | 7/1993 | Sano et al. | | 5,330,301 A | 7/1994 | Brancher |
| 5,231,388 A | 7/1993 | Stoltz | | 5,330,878 A | 7/1994 | Nelson |
| 5,231,432 A | 7/1993 | Glenn | | 5,331,454 A | 7/1994 | Hornbeck |
| 5,233,456 A | 8/1993 | Nelson | | 5,334,991 A | 8/1994 | Wells et al. |
| 5,233,460 A | 8/1993 | Partlo et al. | | 5,339,116 A | 8/1994 | Urbanus et al. |
| 5,233,874 A | 8/1993 | Putty et al. | | 5,339,177 A | 8/1994 | Jenkins et al. |
| 5,237,340 A | 8/1993 | Nelson | | 5,340,772 A | 8/1994 | Rosotker |
| 5,237,435 A | 8/1993 | Kurematsu et al. | | 5,341,579 A | 8/1994 | Schiel et al. |
| 5,239,448 A | 8/1993 | Perkins et al. | | 5,345,521 A | 9/1994 | McDonald et al. |
| 5,239,806 A | 8/1993 | Maslakow | | 5,347,321 A | 9/1994 | Gove |
| 5,240,818 A | 8/1993 | Mignardi et al. | | 5,347,378 A | 9/1994 | Handschy et al. |
| 5,245,686 A | 9/1993 | Faris et al. | | 5,347,433 A | 9/1994 | Sedlmayr |
| 5,247,180 A | 9/1993 | Mitcham et al. | | 5,348,619 A | 9/1994 | Bohannon et al. |
| 5,247,593 A | 9/1993 | Lin et al. | | 5,349,687 A | 9/1994 | Ehlig et al. |
| 5,249,245 A | 9/1993 | Lebby et al. | | 5,351,052 A | 9/1994 | D'Hont et al. |
| 5,251,057 A | 10/1993 | Guerin et al. | | 5,352,926 A | 10/1994 | Andrews |
| 5,251,058 A | 10/1993 | MacArthur | | 5,354,416 A | 10/1994 | Okudaira et al. |
| 5,254,980 A | 10/1993 | Hendrix et al. | | 5,357,369 A | 10/1994 | Pilling et al. |
| 5,255,100 A | 10/1993 | Urbanus | | 5,357,803 A | 10/1994 | Lane |
| 5,256,869 A | 10/1993 | Lin et al. | | 5,359,349 A | 10/1994 | Jambor et al. |
| 5,258,325 A | 11/1993 | Spitzer et al. | | 5,359,451 A | 10/1994 | Gelbart et al. |
| 5,260,718 A | 11/1993 | Rommelmann et al. | | 5,361,131 A | 11/1994 | Tekemori et al. |
| 5,260,798 A | 11/1993 | Um et al. | | 5,363,220 A | 11/1994 | Kuwayama et al. |
| 5,262,000 A | 11/1993 | Welbourn et al. | | 5,365,283 A | 11/1994 | Doherty et al. |

| | | | | | |
|---|---|---|---|---|---|
| 5,367,585 A | 11/1994 | Ghezzo et al. | 5,480,839 A | 1/1996 | Ezawa et al. |
| 5,371,543 A | 12/1994 | Anderson | 5,481,118 A | 1/1996 | Tew |
| 5,371,618 A | 12/1994 | Tai et al. | 5,481,133 A | 1/1996 | Hsu |
| 5,382,961 A | 1/1995 | Gale, Jr. | 5,482,564 A | 1/1996 | Douglas et al. |
| 5,387,924 A | 2/1995 | Gale, Jr. et al. | 5,482,818 A | 1/1996 | Nelson |
| 5,389,182 A | 2/1995 | Mignardi | 5,483,307 A | 1/1996 | Anderson |
| 5,391,881 A | 2/1995 | Jeuch et al. | 5,485,172 A | 1/1996 | Sawachika et al. |
| 5,392,140 A | 2/1995 | Ezra et al. | 5,485,304 A | 1/1996 | Kaeriyama |
| 5,392,151 A | 2/1995 | Nelson | 5,485,354 A | 1/1996 | Ciupke et al. |
| 5,394,303 A | 2/1995 | Yamaji | 5,486,698 A | 1/1996 | Hanson et al. |
| 5,398,071 A | 3/1995 | Gove et al. | 5,486,841 A | 1/1996 | Hara et al. |
| 5,399,898 A | 3/1995 | Rostoker | 5,486,946 A | 1/1996 | Jachimowicz et al. |
| 5,404,365 A | 4/1995 | Hiiro | 5,488,431 A | 1/1996 | Gove et al. |
| 5,404,485 A | 4/1995 | Ban | 5,489,952 A | 2/1996 | Gove et al. |
| 5,408,123 A | 4/1995 | Murai | 5,490,009 A | 2/1996 | Venkateswar et al. |
| 5,410,315 A | 4/1995 | Huber | 5,491,510 A | 2/1996 | Gove |
| 5,411,769 A | 5/1995 | Hornbeck | 5,491,612 A | 2/1996 | Nicewarner, Jr. |
| 5,412,186 A | 5/1995 | Gale | 5,491,715 A | 2/1996 | Flaxl |
| 5,412,501 A | 5/1995 | Fisli | 5,493,177 A | 2/1996 | Muller et al. |
| 5,418,584 A | 5/1995 | Larson | 5,493,439 A | 2/1996 | Engle |
| 5,420,655 A | 5/1995 | Shimizu | 5,497,172 A | 3/1996 | Doherty et al. |
| 5,420,722 A | 5/1995 | Bielak | 5,497,197 A | 3/1996 | Gove et al. |
| 5,426,072 A | 6/1995 | Finnila | 5,497,262 A | 3/1996 | Kaeriyama |
| 5,427,975 A | 6/1995 | Sparks et al. | 5,499,060 A | 3/1996 | Gove et al. |
| 5,430,524 A | 7/1995 | Nelson | 5,499,062 A | 3/1996 | Urbanus |
| 5,435,876 A | 7/1995 | Alfaro et al. | 5,500,761 A | 3/1996 | Goossen et al. |
| 5,438,477 A | 8/1995 | Pasch | 5,502,481 A | 3/1996 | Dentinger et al. |
| 5,439,731 A | 8/1995 | Li et al. | 5,504,504 A | 4/1996 | Markandey et al. |
| 5,442,411 A | 8/1995 | Urbanus et al. | 5,504,514 A | 4/1996 | Nelson |
| 5,442,414 A | 8/1995 | Janssen et al. | 5,504,575 A | 4/1996 | Stafford |
| 5,444,566 A | 8/1995 | Gale et al. | 5,504,614 A | 4/1996 | Webb et al. |
| 5,445,559 A | 8/1995 | Gale et al. | 5,506,171 A | 4/1996 | Leonard et al. |
| 5,446,479 A | 8/1995 | Thompson et al. | 5,506,597 A | 4/1996 | Thompson et al. |
| 5,447,600 A | 9/1995 | Webb | 5,506,720 A | 4/1996 | Yoon |
| 5,448,314 A | 9/1995 | Heimbuch et al. | 5,508,558 A | 4/1996 | Robinette, Jr. et al. |
| 5,448,546 A | 9/1995 | Pauli | 5,508,561 A | 4/1996 | Tago et al. |
| 5,450,088 A | 9/1995 | Meier et al. | 5,508,565 A | 4/1996 | Hatakeyama et al. |
| 5,450,219 A | 9/1995 | Gold et al. | 5,508,750 A | 4/1996 | Hewlett et al. |
| 5,451,103 A | 9/1995 | Hatanaka et al. | 5,508,840 A | 4/1996 | Vogel et al. |
| 5,452,024 A | 9/1995 | Sampsell | 5,508,841 A | 4/1996 | Lin et al. |
| 5,452,138 A | 9/1995 | Mignardi et al. | 5,510,758 A | 4/1996 | Fujita et al. |
| 5,453,747 A | 9/1995 | D'Hont et al. | 5,510,824 A | 4/1996 | Nelson |
| 5,453,778 A | 9/1995 | Venkateswar et al. | 5,512,374 A | 4/1996 | Wallace et al. |
| 5,453,803 A | 9/1995 | Shapiro et al. | 5,512,748 A | 4/1996 | Hanson |
| 5,454,160 A | 10/1995 | Nickel | 5,515,076 A | 5/1996 | Thompson et al. |
| 5,454,906 A | 10/1995 | Baker et al. | 5,516,125 A | 5/1996 | McKenna |
| 5,455,445 A | 10/1995 | Kurtz et al. | 5,517,340 A | 5/1996 | Doany et al. |
| 5,455,455 A | 10/1995 | Badehi | 5,517,347 A | 5/1996 | Sampsell |
| 5,455,602 A | 10/1995 | Tew | 5,517,357 A | 5/1996 | Shibayama |
| 5,457,493 A | 10/1995 | Leddy et al. | 5,517,359 A | 5/1996 | Gelbart |
| 5,457,566 A | 10/1995 | Sampsell et al. | 5,519,251 A | 5/1996 | Sato et al. |
| 5,457,567 A | 10/1995 | Shinohara | 5,519,450 A | 5/1996 | Urbanus et al. |
| 5,458,716 A | 10/1995 | Alfaro et al. | 5,521,748 A | 5/1996 | Sarraf |
| 5,459,492 A | 10/1995 | Venkateswar | 5,523,619 A | 6/1996 | McAllister et al. |
| 5,459,528 A | 10/1995 | Pettitt | 5,523,628 A | 6/1996 | Williams et al. |
| 5,459,592 A | 10/1995 | Shibatani et al. | 5,523,803 A | 6/1996 | Urbanus et al. |
| 5,459,610 A | 10/1995 | Bloom et al. | 5,523,878 A | 6/1996 | Wallace et al. |
| 5,461,197 A | 10/1995 | Hiruta et al. | 5,523,881 A | 6/1996 | Florence et al. |
| 5,461,410 A | 10/1995 | Venkateswar et al. | 5,523,920 A | 6/1996 | Machuga et al. |
| 5,461,411 A | 10/1995 | Florence et al. | 5,524,155 A | 6/1996 | Weaver |
| 5,461,547 A | 10/1995 | Ciupke et al. | 5,534,107 A | 7/1996 | Gray et al. |
| 5,463,347 A | 10/1995 | Jones et al. | 5,534,883 A | 7/1996 | Koh |
| 5,463,497 A | 10/1995 | Muraki et al. | 5,539,422 A | 7/1996 | Heacock et al. |
| 5,465,175 A | 11/1995 | Woodgate et al. | 5,544,306 A | 8/1996 | Deering et al. |
| 5,467,106 A | 11/1995 | Salomon | 5,552,635 A | 9/1996 | Kim et al. |
| 5,467,138 A | 11/1995 | Gove | 5,554,304 A | 9/1996 | Suzuki |
| 5,467,146 A | 11/1995 | Huang et al. | 5,576,878 A | 11/1996 | Henck |
| 5,469,302 A | 11/1995 | Lim | 5,602,671 A | 2/1997 | Hornbeck |
| 5,471,341 A | 11/1995 | Warde et al. | 5,606,181 A | 2/1997 | Sakuma et al. |
| 5,473,512 A | 12/1995 | Degani et al. | 5,606,447 A | 2/1997 | Asada et al. |
| 5,475,236 A | 12/1995 | Yoshizaki | 5,610,438 A | 3/1997 | Wallace et al. |

| | | | | | |
|---|---|---|---|---|---|
| 5,623,361 A | 4/1997 | Engle | 5,955,771 A | 9/1999 | Kurtz et al. |
| 5,629,566 A | 5/1997 | Doi et al. | 5,963,788 A | 10/1999 | Barron et al. |
| 5,629,801 A | 5/1997 | Staker et al. | 5,978,127 A | 11/1999 | Berg |
| 5,640,216 A | 6/1997 | Hasegawa et al. | 5,982,553 A | 11/1999 | Bloom et al. |
| 5,658,698 A | 8/1997 | Yagi et al. | 5,986,634 A | 11/1999 | Alioshin et al. ............ 345/126 |
| 5,661,592 A | 8/1997 | Bornstein et al. | 5,986,796 A | 11/1999 | Miles |
| 5,661,593 A | 8/1997 | Engle | 5,995,303 A | 11/1999 | Honguh et al. |
| 5,663,817 A | 9/1997 | Frapin et al. | 5,999,319 A | 12/1999 | Castracane |
| 5,668,611 A | 9/1997 | Ernstoff et al. | 6,004,912 A | 12/1999 | Gudeman |
| 5,673,139 A | 9/1997 | Johnson | 6,012,336 A | 1/2000 | Eaton et al. |
| 5,677,783 A | 10/1997 | Bloom et al. | 6,016,222 A | 1/2000 | Setani et al. |
| 5,689,361 A | 11/1997 | Damen et al. | 6,025,859 A | 2/2000 | Ide et al. |
| 5,691,836 A | 11/1997 | Clark | 6,038,057 A | 3/2000 | Brazas, Jr. et al. |
| 5,694,740 A | 12/1997 | Martin et al. | 6,040,748 A | 3/2000 | Gueissaz |
| 5,696,560 A | 12/1997 | Songer | 6,046,840 A | 4/2000 | Huibers |
| 5,699,740 A | 12/1997 | Gelbart | 6,055,090 A | 4/2000 | Miles |
| 5,704,700 A | 1/1998 | Kappel et al. | 6,057,520 A | 5/2000 | Goodwin-Johansson |
| 5,707,160 A | 1/1998 | Bowen | 6,061,166 A | 5/2000 | Furlani et al. |
| 5,712,649 A | 1/1998 | Tosaki | 6,061,489 A | 5/2000 | Ezra et al. |
| 5,713,652 A | 2/1998 | Zavracky et al. | 6,062,461 A | 5/2000 | Sparks et al. |
| 5,726,480 A | 3/1998 | Pister | 6,064,404 A | 5/2000 | Aras et al. |
| 5,731,802 A | 3/1998 | Aras et al. | 6,069,392 A | 5/2000 | Tai et al. |
| 5,734,224 A | 3/1998 | Tagawa et al. | 6,071,652 A | 6/2000 | Feldman et al. |
| 5,742,373 A | 4/1998 | Alvelda | 6,075,632 A | 6/2000 | Braun |
| 5,744,752 A | 4/1998 | McHerron et al. | 6,084,626 A | 7/2000 | Ramanujan et al. |
| 5,745,271 A | 4/1998 | Ford et al. | 6,088,102 A | 7/2000 | Manhart |
| 5,757,354 A | 5/1998 | Kawamura | 6,090,717 A | 7/2000 | Powell et al. |
| 5,757,536 A | 5/1998 | Ricco et al. | 6,091,521 A | 7/2000 | Popovich |
| 5,764,280 A | 6/1998 | Bloom et al. | 6,096,576 A | 8/2000 | Corbin et al. |
| 5,768,009 A | 6/1998 | Little | 6,096,656 A | 8/2000 | Matzke et al. |
| 5,773,473 A | 6/1998 | Green et al. | 6,097,352 A | 8/2000 | Zavracky et al. |
| 5,793,519 A | 8/1998 | Furlani et al. | 6,101,036 A | 8/2000 | Bloom |
| 5,798,743 A | 8/1998 | Bloom | 6,115,168 A | 9/2000 | Zhao et al. |
| 5,798,805 A | 8/1998 | Ooi et al. | 6,122,299 A | 9/2000 | DeMars et al. |
| 5,801,074 A | 9/1998 | Kim et al. | 6,123,985 A | 9/2000 | Robinson et al. |
| 5,802,222 A | 9/1998 | Rasch et al. | 6,124,145 A | 9/2000 | Stemme et al. |
| 5,808,323 A | 9/1998 | Spaeth et al. | 6,130,770 A | 10/2000 | Bloom |
| 5,808,797 A | 9/1998 | Bloom et al. | 6,144,481 A | 11/2000 | Kowarz et al. |
| 5,815,126 A | 9/1998 | Fan et al. | 6,147,789 A | 11/2000 | Gelbart |
| 5,825,443 A | 10/1998 | Kawasaki et al. | 6,154,259 A | 11/2000 | Hargis et al. |
| 5,832,148 A | 11/1998 | Yariv | 6,154,305 A | 11/2000 | Dickensheets et al. |
| 5,835,255 A | 11/1998 | Miles | 6,163,026 A | 12/2000 | Bawolek et al. |
| 5,835,256 A | 11/1998 | Huibers | 6,163,402 A | 12/2000 | Chou et al. |
| 5,837,562 A | 11/1998 | Cho | 6,169,624 B1 | 1/2001 | Godil et al. |
| 5,841,579 A | 11/1998 | Bloom et al. | 6,172,796 B1 | 1/2001 | Kowarz et al. |
| 5,841,929 A | 11/1998 | Komatsu et al. | 6,172,797 B1 | 1/2001 | Huibers |
| 5,844,711 A | 12/1998 | Long, Jr. | 6,177,980 B1 | 1/2001 | Johnson |
| 5,847,859 A | 12/1998 | Murata | 6,181,458 B1 | 1/2001 | Brazas, Jr. et al. ......... 359/290 |
| 5,862,164 A | 1/1999 | Hill | 6,188,519 B1 | 2/2001 | Johnson |
| 5,868,854 A | 2/1999 | Kojima et al. | 6,195,196 B1 | 2/2001 | Kimura et al. |
| 5,886,675 A | 3/1999 | Aye et al. | 6,197,610 B1 | 3/2001 | Toda |
| 5,892,505 A | 4/1999 | Tropper | 6,210,988 B1 | 4/2001 | Howe et al. |
| 5,895,233 A | 4/1999 | Higashi et al. | 6,215,579 B1 | 4/2001 | Bloom et al. |
| 5,898,515 A | 4/1999 | Furlani et al. | 6,219,015 B1 | 4/2001 | Bloom et al. |
| 5,903,243 A | 5/1999 | Jones | 6,222,954 B1 | 4/2001 | Riza |
| 5,903,395 A | 5/1999 | Rallison et al. | 6,229,650 B1 | 5/2001 | Reznichenko et al. |
| 5,910,856 A | 6/1999 | Ghosh et al. | 6,229,683 B1 | 5/2001 | Goodwin-Johansson |
| 5,912,094 A | 6/1999 | Aksyuk et al. | 6,241,143 B1 | 6/2001 | Kuroda |
| 5,912,608 A | 6/1999 | Asada | 6,251,842 B1 | 6/2001 | Gudeman |
| 5,914,801 A | 6/1999 | Dhuler et al. | 6,252,697 B1 | 6/2001 | Hawkins et al. |
| 5,915,168 A | 6/1999 | Salatino et al. | 6,254,792 B1 | 7/2001 | Van Buskirk et al. |
| 5,919,548 A | 7/1999 | Barron et al. | 6,261,494 B1 | 7/2001 | Zavracky et al. |
| 5,920,411 A | 7/1999 | Duck et al. | 6,268,952 B1 | 7/2001 | Godil et al. |
| 5,920,418 A | 7/1999 | Shiono et al. | 6,271,145 B1 | 8/2001 | Toda |
| 5,923,475 A | 7/1999 | Kurtz et al. | 6,271,808 B1 | 8/2001 | Corbin |
| 5,926,309 A | 7/1999 | Little | 6,274,469 B1 | 8/2001 | Yu |
| 5,926,318 A | 7/1999 | Hebert | 6,290,859 B1 | 9/2001 | Fleming et al. |
| 5,942,791 A | 8/1999 | Shorrocks et al. | 6,290,864 B1 | 9/2001 | Patel et al. |
| 5,949,390 A | 9/1999 | Nomura et al. | 6,300,148 B1 | 10/2001 | Birdsley et al. |
| 5,949,570 A | 9/1999 | Shiono et al. | 6,303,986 B1 | 10/2001 | Shook |
| 5,953,161 A | 9/1999 | Troxell et al. | 6,310,018 B1 | 10/2001 | Behr et al. |

| | | |
|---|---|---|
| 6,323,984 B1 | 11/2001 | Trisnadi |
| 6,327,071 B1 | 12/2001 | Kimura |
| 6,342,960 B1 | 1/2002 | McCullough |
| 6,356,577 B1 | 3/2002 | Miller |
| 6,356,689 B1 | 3/2002 | Greywall |
| 6,359,333 B1 | 3/2002 | Wood et al. |
| 6,384,959 B1 | 5/2002 | Furlani et al. |
| 6,387,723 B1 | 5/2002 | Payne et al. |
| 6,392,309 B1 | 5/2002 | Wataya et al. |
| 6,396,789 B1 | 5/2002 | Guerra et al. |
| 6,421,179 B1 | 7/2002 | Gutin et al. |
| 6,438,954 B1 | 8/2002 | Goetz et al. |
| 6,445,502 B1 | 9/2002 | Islam et al. |
| 6,452,260 B1 | 9/2002 | Corbin et al. |
| 6,466,354 B1 | 10/2002 | Gudeman |
| 6,480,634 B1 | 11/2002 | Corrigan |
| 6,497,490 B1 | 12/2002 | Miller et al. |
| 6,525,863 B1 | 2/2003 | Riza |
| 6,563,974 B2 | 5/2003 | Agha Riza |
| 6,565,222 B1 | 5/2003 | Ishii et al. |
| 2001/0019454 A1 | 9/2001 | Tadic-Galeb et al. |
| 2002/0015230 A1 | 2/2002 | Pilossof et al. |
| 2002/0021485 A1 | 2/2002 | Pilossof |
| 2002/0079432 A1 | 6/2002 | Lee et al. |
| 2002/0105725 A1 | 8/2002 | Sweatt et al. |
| 2002/0112746 A1 | 8/2002 | DeYoung et al. |
| 2002/0131228 A1 | 9/2002 | Potter |
| 2002/0131230 A1 | 9/2002 | Potter |
| 2002/0195418 A1 | 12/2002 | Kowarz et al. |
| 2002/0196492 A1 | 12/2002 | Trianadi et al. |

FOREIGN PATENT DOCUMENTS

| | | |
|---|---|---|
| EP | 0 261 901 A2 | 3/1988 |
| EP | 0 314 437 A1 | 10/1988 |
| EP | 0 304 263 A2 | 2/1989 |
| EP | 0 306 308 A2 | 3/1989 |
| EP | 0 322 714 A2 | 7/1989 |
| EP | 0 627 644 A3 | 9/1990 |
| EP | 0 417 039 A1 | 3/1991 |
| EP | 0 423 513 A2 | 4/1991 |
| EP | 0 436 738 A1 | 7/1991 |
| EP | 0 458 316 A2 | 11/1991 |
| EP | 0 488 326 A3 | 6/1992 |
| EP | 0 499 566 A2 | 8/1992 |
| EP | 0 528 646 A1 | 2/1993 |
| EP | 0 530 760 A2 | 3/1993 |
| EP | 0 550 189 A1 | 7/1993 |
| EP | 0 610 665 A1 | 8/1994 |
| EP | 0 627 644 A2 | 12/1994 |
| EP | 0 627 850 A1 | 12/1994 |
| EP | 0 643 314 A2 | 3/1995 |
| EP | 0 654 777 A1 | 5/1995 |
| EP | 0 658 868 A1 | 6/1995 |
| EP | 0 658 830 A1 | 12/1995 |
| EP | 0 689 078 A1 | 12/1995 |
| EP | 0 801 319 A1 | 10/1997 |
| EP | 0 851 492 A2 | 7/1998 |
| EP | 1 003 071 A2 | 5/2000 |
| EP | 1 014 143 A1 | 6/2000 |
| EP | 1 040 927 A2 | 10/2000 |
| GB | 2 117 564 A | 10/1983 |
| GB | 2 118 365 A | 10/1983 |
| GB | 2 266 385 A | 10/1993 |
| GB | 2 296 152 A | 6/1996 |
| GB | 2 319 424 A | 5/1998 |
| JP | 53-39068 | 4/1978 |
| JP | 55-111151 | 8/1980 |
| JP | 57-31166 | 2/1982 |
| JP | 57-210638 | 12/1982 |
| JP | 60-49638 | 3/1985 |
| JP | 60-94756 | 5/1985 |
| JP | 60-250639 | 12/1985 |
| JP | 61-142750 | 6/1986 |
| JP | 61-145838 | 7/1986 |
| JP | 63-234767 | 9/1988 |
| JP | 63-305323 | 12/1988 |
| JP | 1-155637 | 6/1989 |
| JP | 40-1155637 | 6/1989 |
| JP | 2219092 | 8/1990 |
| JP | 4-333015 | 11/1992 |
| JP | 7-281161 | 10/1995 |
| JP | 3288369 | 3/2002 |
| WO | WO 90/13913 | 11/1990 |
| WO | WO 92/12506 | 7/1992 |
| WO | WO 93/02269 | 2/1993 |
| WO | WO 93/09472 | 5/1993 |
| WO | WO 93/18428 | 9/1993 |
| WO | WO93/22694 | 11/1993 |
| WO | WO 94/09473 | 4/1994 |
| WO | WO 94/29761 | 12/1994 |
| WO | WO 95/11473 | 4/1995 |
| WO | WO 96/02941 | 2/1996 |
| WO | WO 96/08031 | 3/1996 |
| WO | WO 96/41217 | 12/1996 |
| WO | WO 96/41224 | 12/1996 |
| WO | WO 97/22033 | 6/1997 |
| WO | WO 97/26569 | 7/1997 |
| WO | WO 98/05935 | 2/1998 |
| WO | WO 98/24240 | 6/1998 |
| WO | WO 98/41893 | 9/1998 |
| WO | WO 99/07146 | 2/1999 |
| WO | WO 99/12208 | 3/1999 |
| WO | WO 99/23520 | 5/1999 |
| WO | WO 99/34484 | 7/1999 |
| WO | WO 99/59335 | 11/1999 |
| WO | WO 99/63388 | 12/1999 |
| WO | WO 99/67671 | 12/1999 |
| WO | WO 00/04718 | 1/2000 |
| WO | WO 00/07225 | 2/2000 |
| WO | WO 01/04674 A1 | 1/2001 |
| WO | WO 01/3006297 | 1/2001 |
| WO | WO 01/57581 A3 | 8/2001 |
| WO | WO 02/3025348 A3 | 3/2002 |
| WO | WO 02/31575 A2 | 4/2002 |
| WO | WO 02/058111 A2 | 7/2002 |
| WO | WO 02/065184 A3 | 8/2002 |
| WO | WO 02/073286 A2 | 9/2002 |
| WO | WO 02/084375 A1 | 10/2002 |
| WO | WO 02/084397 A3 | 10/2002 |
| WO | WO 03/001281 A1 | 1/2003 |
| WO | WO 03/001716 A1 | 1/2003 |
| WO | WO 03/012523 A1 | 2/2003 |
| WO | WO 03/016965 A1 | 2/2003 |
| WO | WO 03/023849 A1 | 3/2003 |
| WO | WO 03/025628 A2 | 3/2003 |

OTHER PUBLICATIONS

Apte et al., "Deformable Grating Light Valves for High Resolution Displays," Solid State Actuator Workshop, Hilton Head, South Carolina, Jun. 13–16, 1994.

Sene et al., "Polysilicon micromechanical gratings for optical modulation," Sensors and Actuators, vol. A57, pp. 145–151, 1996.

Amm et al., "Invited Paper: Grating Light Valve™ Technology: Update and Novel Applications," SID Digest, vol. 29, 1998.

R. Apte, "Grating Light Valves for High Resolution Displays", Solid State Sensors and Actuators Workshop, Ph D. Dissertation, Stanford University (Jun. 1994).

O. Solgaard, "Integrated Semiconductor Light Modluators for Fiber–Optic and Display Applications", Ph.D. Dissertation, Stanford University Feb.,1992.

J. Neff, "Two–Dimensional Spatial Light Modulators: A Tutorial", Proceedings of the IEEE, vol. 78, No. 5, (May 1990), pp. 826–855.

R. Gerhard–Multhaupt, "Viscoelastic Spatial Light Modulators and Schlieren–Optical Systems for HDTV Projection Displays" SPIE vol. 1255 Large Screen Projection Displays II (1990), pp. 69–78.

R. Gerhard–Multhaupt, "Light–Valve Technologies for High–Definition Television Projectioin Displays", Displays vol. 12, No. 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

F. Sandejas, R. Apte, W. Banyai, and D. Bloom, "Surface Microfabrication of Deformable Grating Valve for High Resolution Displays," The $7^{th}$ International Conference on Solid–State Sensors and Actuators.

P. Alvelda, "High Efficency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, Chelmsford, Essex, GB 1993.

M. Fam et al., "Color Separation by use of Binary Optics," Optics Letters, vol. 18:15 pp. 1214–1216, 1993.

P. Alvelda, "VLSI Microdisplays and Optoelectric Technology," MIT, pp. 1–93, 1995.

P. Alvelda, "VLSI Microdisplay Technology," Oct. 14, 1994.

L. Hornbeck, "Deformable–Mirror Spatial Light Modulators," Spatial Light Modulators and Applications III, Aug. 8, CA 1989, pp. 86–102.

Russick et al., "Supercritical Carbon Dioxide Extraction of Solvent from Micromachined Structures," Supercritical Fluids, Chapter 18, American Chemical Society, pp. 255–269, 1997.

Buhler et al., "Linear Array of Complementay Metal Oxide Semiconductor Double–Pass Metal Micromirrors," Optical Engineering, vol. 36, No. 5, pp. 1391–1398, 1997.

Gani et al., "Variable Gratings for Optical Switching: Rigorous Electromagnetic Simulation and Design," Optical Engineering, vol. 38, No. 3, pp. 552–557, March 1999.

R. Tepe, et al., "Viscoelastic Spatial Light Modulator with Active Matrix Addressing," Applied Optics, vol. 28, No. 22, New York, USA, pp. 4826–4834, Nov. 15, 1989.

T. Utsunomiya and H. Sato, "Electrically Deformable Echellette Grating and its Application to Tunable Laser Resonator," Electronics and Communications in Japan, vol. 63–c, No. 10, pp. 94–100, Japan, 1980.

Burns, D.M. et al., *Development of microelectromechanical variable blaze gratings*, Sensors and Actuators A, pp. 7–15, 1998.

R. N. Thomas, et al., "The Mirror–Matrix Tube: A Novel Light Valve for Projection Displays", IEEE Transactions on Electron Devices, vol. ED–22, No. 9, pp. 765–775, September 1975.

J. Guldberg, et al., "An Aluminum/SiO2/Silicon–on–Sapphire Light Valve Matrix for Projection Displays," Applied Physics Letters, vol. 26, No. 7, pp. 391–393, April 1975.

Beck Mason et al., "Directly Modulated Sampled Grating DBR Lasers for Long–Haul WDM Communication Systems" IEEE Photonics Technology Letters, vol. 9, No. 3, March 1997, pp. 377 of 379.

N. J. Frigo et al., "A Wavelength–Division Multiplexed Passive Optical Network with Cost–Shared Components", IEEE Photonics Technology Letters, vol. 6, No. 11, Nov. 1994, pp. 1365 of 1367.

M. S. Goodman et al., "The LAMBDANET Multiwavelength Network; Architecture, Applications, and Demonstrations", IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum—Optical Components, Feb. 2001, pp. 1 of 10.

R. Plastow, "Tunable Lasers and Future Optical Networks", Forum—Tunable Laser, Aug. 2000, pp. 58 of 62.

Elizabeth Bruce, "Tunable Lasers", Communications, IEEE Spectrum, Feb. 2002, pp. 35 of 39.

M. G. Litman et al., "Spectrally Narrow Pulsed Dye Laser without Beam Expander", Applied Optics, vol. 17, No. 14, Jul. 15, 1978, pp. 2224 of 2727.

Apte et al., "Deformable Grating Light Valves for High Resolution Displays," Solid State Actuator Workshop, Hilton Head, South Carolina, Jun. 13–16, 1994.

Sene et al., "Polysilicon micromechnical gratings for optical modulation," Sensors and Actuators, vol. A57, pp. 145–151, 1996.

Amm et al., "Invited Paper: Grating Light Valve™ Technology: Update and Novel Applications," SID Digest, vol. 29, 1998.

"Micromechined Opto/Electro/Mechanical Systems," Electronic Systems, NASA Tech Briefs, Mar. 1997, pp. 50 & 52.

S. T. Pai, et al., "Electromigration in Metals", Received Jun. 4, 1976, pp. 103–115.

Olga B. Spahn, et al., "High Optical Power Handling of Pop–Up Microelectromechanical Mirrors", Sandia National Laboratories, IEEE 2000, pp. 51–52.

David M. Burns, et al., "Optical Power Induced Damage to Microelectromechanical Mirrors", Sensors and Actuators A 70, 1998, pp. 6–14.

V. S. Aliev et al., "Development of Si(100) surface roughness at the initial stage of etching in F2 and XeF2 gases: ellipsometric study," Surface Science 442 (1999), pp. 206–214.

Xuan–Qi Wang et al., "Gas–Phase Silicon Etching with Bromine Trifluoride," Depart. of Electrical Engineering, 136–93 California Institute of Technology, 1997 IEEE, pp. 1505–1508.

LIGHT MODULATOR STRUCTURE FOR PRODUCING HIGH-CONTRAST OPERATION USING ZERO-ORDER LIGHT

FIELD OF THE INVENTION

The present invention relates to a method of and an apparatus for modulating a beam of light. More particularly, this invention relates to a light modulator structure for producing high-contrast operation using zero-order light.

BACKGROUND OF THE INVENTION

Light modulators are used in many telecommunications applications including optical switching. Light modulators, and in particular grating light valve™ light modulators, utilize first order light to obtain higher-contrast operation. A conventional grating light valve™ light modulator includes a series of elongated, reflective ribbons arranged adjacently and in parallel. When the ribbons lie in an un-deflected, or flat, state, an incident beam of light reflects off the grating light valve™ light modulator as a mirror. If alternating ribbons are pulled down, or deflected, then the incident light diffracts. In operation, a through-state is considered to be when the alternating ribbons are deflected by a predetermined distance, thereby obtaining maximum diffraction of the incident light, and the diffracted first order light is collected. Inefficiencies arise since the first order light is not the only diffracted light in the deflected state. Higher orders of light are also produced including second order, third order, etc. These higher orders are not collected and are therefore wasted. This reduces efficiency.

Problems arise in association with the collection process of the first order light When the incident light is diffracted in the through-state, different wavelengths diffact at different angles. Larger wavelengths have larger diffraction angles. As such, any wavelength combiner used for collecting the first order light must be sufficiently large to account for the varying wavelength diffraction angles. A wavelength combiner is also called a wavelength multiplexer, examples of which include a dichroic filter, a diffraction grating, and an array waveguide. Unfortunately, the larger the combiner, the less efficient is the collection process and the lower the contrast ratio provided. Further, since the first order light includes a plus and minus component, two such filters are necessary to collect each the plus and minus first order light.

Design of the optical system must not only account for collecting of the plus and minus first order light, but also must isolate the first order light from the higher order light. Since the different wavelengths diffract at different angles, the optical system must ensure sufficient discrimination of zero and first order diffraction of all wavelengths. Considering the isolation and collection constraints of such a system, the optical design considerations using a conventional grating light valve™ light modulator are substantial.

Additionally, high-contrast operation is essential for performing optical switching where 30–40 dB of contrast is necessary. However, conventional zero and first order operation often does not produce high enough contrast needed for optical switching.

What is needed is a spatial light modulator and associated optical system that is easier to design and implement. What is also needed is a spatial light modulator and associated optical system with increased contrast and improved efficiency.

SUMMARY OF THE INVENTION

An optical system of the present invention provides high-contrast operation by collecting zero order light. The optical system comprises a light modulator and a collector. The light modulator is preferably a grating light valve™ light modulator including a plurality of elements selectively operable in a first mode and a second mode, wherein a gap between adjacent elements is equal to or less than a wavelength of an incident light beam. The plurality of elements in the first mode reflect light along a return path, where the plurality of elements in the second mode direct light away from the return path. The collector is coupled to the light modulator to collect zero order light along the return path while the plurality of elements are in the first mode and in the second mode.

The collector comprises Schlieren optics and an optical train. The Schlieren optics pass the zero order light. The optical train directs the zero order light to an optical fiber, a display device, a thermal printer or any other appropriate application.

The first mode comprises a reflection mode in which the plurality of elements reflect the incident light beam as a plane mirror. The second mode comprises a diffraction mode in which the plurality of elements comprise a first group of elongated elements interdigitated with a second group of elongated elements. A height difference between the first elongated elements and the second elongated elements causes the incident light beam to diffract away from the return path.

DETAILED DESCRIPTION OF THE EMBODIMENTS

The present invention provides high-contrast operation in the order of 30 dB and higher while improving efficiency and substantially reducing the optical design constraints of a conventional grating light valve™ light modulator-based modulator. Such results are achieved by paying proper attention to the grating light valve™ light modulator structure and collecting the zero order light. Zero order light is the light that is specularly reflected off the grating light valve™ light modulator. This is in contrast to conventional operation in which it was believed to be essential to collect the diffracted first order light in order to achieve high-contrast optical switching. Prior designs of the grating light valve™ light modulator emphasize the width of the grating light valve™ light modulator ribbons and the pixel pitch as the most relevant design parameters. The design of the present invention demonstrates that reduction of the size of the gap between the grating light valve™ light modulator ribbons below a certain fraction of the wavelength light interacting with the grating light valve™ light modulator permits very high-contrast ratio performance in zero order operation. To further illustrate this point, consider the FIGS. 1–4.

Figure 1:
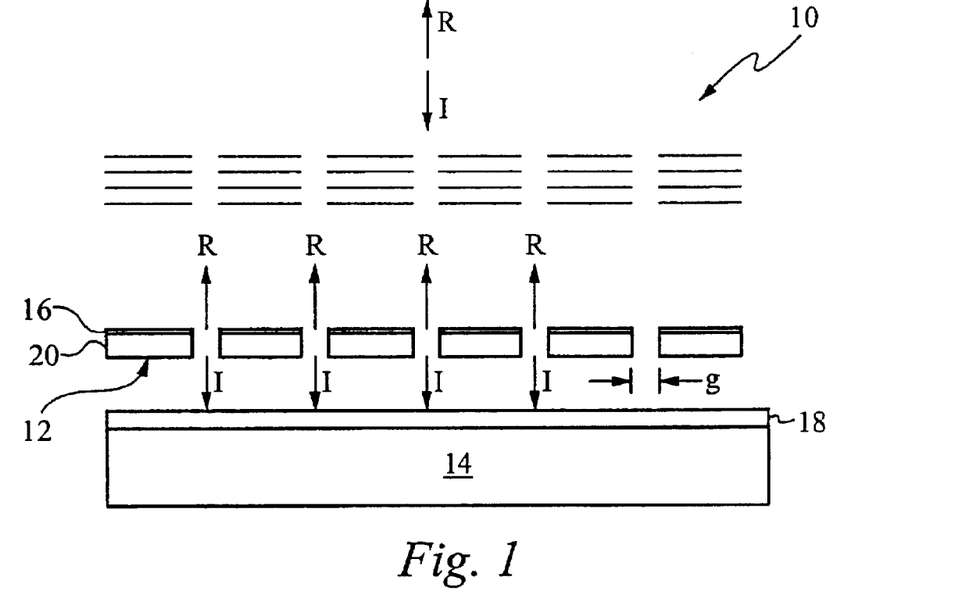
FIG. 1 illustrates a cross-section of an exemplary grating light valve™ light modulator in a reflection mode.

A cross-section of an exemplary grating light valve™ light modulator 10 is illustrated in FIG. 1. The grating light valve™ light modulator 10 comprises elongated elements 12 suspended above a substrate 14. The elongated elements 12 can be suspended by posts (not shown) or some other support structure that maintains the positions of each elongated element 12 relative to each other. The elongated elements 12 comprise a conducting and reflective surface 16 and a resilient material 20. The substrate 14 comprises a conductor 18. Each elongated element 12 is separated from an adjacent elongated element by a gap g. In FIG. 1, the gap g is greater than a wavelength $\lambda$ of incident light I. FIG. 1 depicts the grating light valve™ light modulator 10 in the reflection mode. In the reflection mode, the conducting and reflecting surfaces 16 of the elongated elements 12 form a plane so that incident light I reflects from the elongated elements 12 to produce reflected light R. However, a portion of the incident light I impinges the grating light valve™ light modulator 10 at the gaps g instead of the elongated elements 12. Due to the gap g being greater than the wavelength $\lambda$, a portion of this incident light I will pass between adjacent elongated elements and reflect off the conductor 18.

It will be readily apparent to one skilled in the art that the conducting and reflecting surface 16 can be replaced by a multilayer dielectric reflector in which case a conducting element would also be included in each of the elongated elements 12. Further, it will be readily apparent to one skilled in the art that the conducting and reflecting surface 16 can be coated with apparent layer such as an anti-reflective layer.

Figure 2:
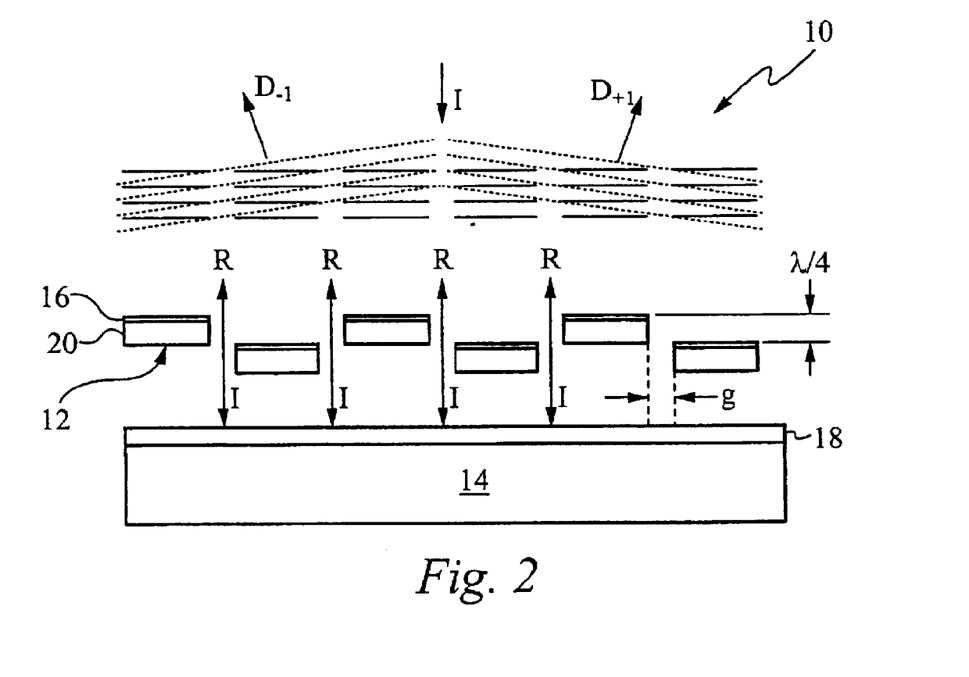
FIG. 2 illustrates a cross-section of an exemplary grating light valve™ light modulator in a diffraction mode.

FIG. 2 depicts the grating light valve™ light modulator 10 in the diffraction mode. In the diffraction mode, an electrical bias causes alternate ones of the elongated elements 12 to move toward the substrate 14. The electrical bias is applied between the reflecting and conducting surfaces 16 of the alternate ones of the elongated elements 12 and the conductor 18. The electrical bias results in a height difference of a quarter wavelength $\lambda/4$ of the incident light I between the alternate ones of the elongated elements 12 and non-biased ones of the elongated elements 12. The height difference of the quarter wavelength $\lambda/4$ produces diffracted light including plus one and minus one diffraction orders, $D_{+1}$ and $D_{-1}$. $D_{+1}$ and $D_{-1}$ are considered together as first order light.

FIGS. 1 and 2 depict the grating light valve™ light modulator 10 in the reflection and diffraction modes, respectively. For a deflection of the alternate ones of the elongated elements 12 of less than a quarter wavelength $\lambda/4$, the incident light I both reflects and diffracts off the elongated elements 12 producing the reflected light R and the diffracted light including the plus one and minus one diffraction orders, $D_{+1}$ and $D_{-1}$. In other words, by deflecting the alternate ones of the elongated elements less the quarter wavelength $\lambda/4$, the grating light valve™ light modulator 10 produces a variable reflectivity.

It can be seen from FIG. 2 that since the gap g is sufficiently large, g>$\lambda$, there remains the portion of the incident light I that is reflected as zero order light and diffracted as even order light, e.g. plus and minus second order, fourth order, etc., regardless of the elongated elements 12 being pulled down or not. This portion of the incident light I is reflected regardless of the state of the elongated elements 12. Such a condition reduces contrast. If contrast is defined as the difference between the lightest and darkest measured conditions, then the optimal contrast can be defined as all light versus no light. Optimal contrast can also be defined as all incident light I being reflected versus all incident light I being diffracted. If a portion of the incident light I is never diffracted, then the contrast is reduced from optimal. An essential aspect of achieving good contrast is to make sure that the most light possible is being diffracted when the elongated elements are pulled down. Conventional GLVs of the type shown in FIGS. 1 and 2 attempt to circumvent the impact of the un-diffracted light by collecting the first order light instead of the zero order light In this first order operation, the GLV is in the through-state when the elongated elements are in the diffracted mode and the resulting first order light is collected. However, with first order operation comes the previously discussed characteristics of reduced light intensity and decreased efficiency due to the unused higher order light, and increased optical complexity related to collection of the first order light.

Figure 3:
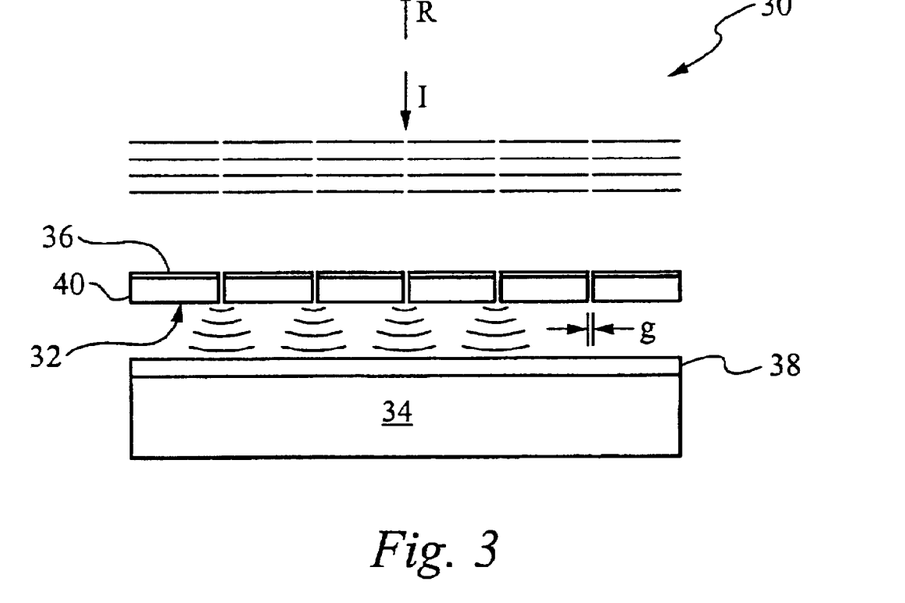
FIG. 3 illustrates a cross-section of a grating light valve™ light modulator in a reflection mode according to the preferred embodiment of the present invention.

FIG. 3 illustrates a grating light valve™ light modulator 30 according to the preferred embodiment of the present invention. The grating light valve™ light modulator 30 comprises elongated elements 32 suspended above a substrate 34. The elongated elements 32 can be suspended by posts (not shown) or some other support structure that maintains the positions of each elongated element 32 relative to each other. The elongated elements 32 comprise a conducting and reflective surface 36 and a resilient material 40. The substrate 34 comprises a conductor 38. Each elongated element 32 is separated from an adjacent elongated element by a gap g. In contrast to FIG. 1 in which the gap g is greater than the wavelength $\lambda$ of incident light I, the gap g in FIG. 3 is less than or equal to the wavelength $\lambda$. With g$\leq\lambda$, high-contrast operation is possible by collecting the zero-order light. The gap g effective to enable this zero order operation is preferably less than or equal to the wavelength $\lambda$ of the incident light I, g$\leq\lambda$, and more preferably g$\leq\lambda/2$.

FIG. 3 depicts the grating light valve™ light modulator 30 in the reflection mode. In the reflection mode, the conducting and reflecting surfaces 36 of the elongated elements 32 form a plane so that incident light I reflects from the elongated elements 32 to produce reflected light R. Since the gap g is sufficiently small, none of the incident light I passes through the gap g unaffected. Any portion of the incident light I that passes through the gap g is diffracted, as shown in FIG. 3. This is in contrast to the grating light valve™ light modulator 10 in FIG. 1 where, due to the gap g being greater than the wavelength $\lambda$, a portion of this incident light I will pass un-effected between adjacent elongated elements and reflect off the conductor 8.

Figure 4:
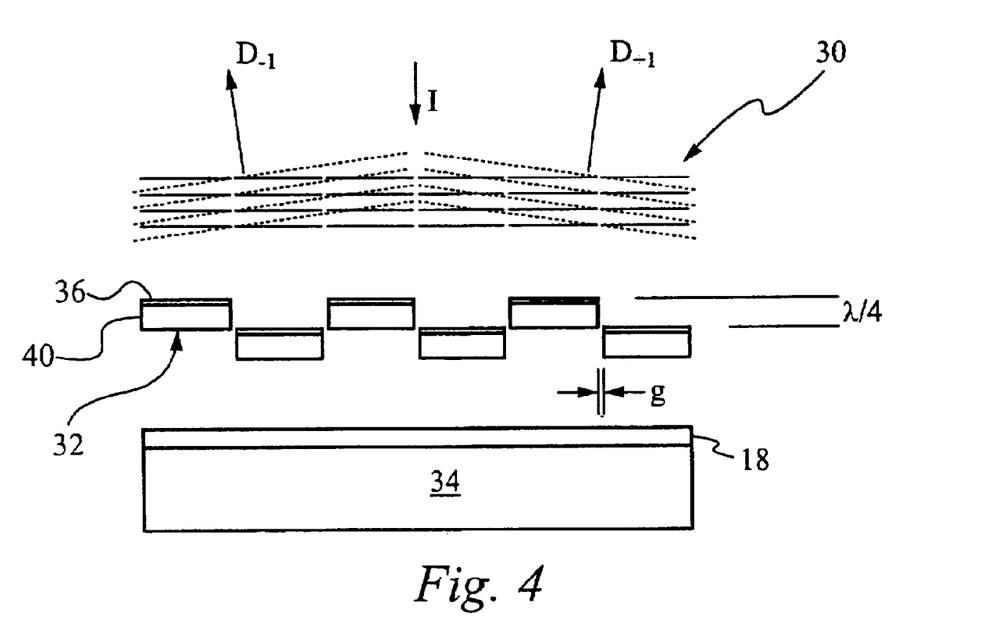
FIG. 4 illustrates a cross-section of a grating light valve™ light modulator in a diffraction mode according to the preferred embodiment of the present invention.

FIG. 4 depicts the grating light valve™ light modulator 30 in the diffraction mode. In the diffraction mode, an electrical bias causes alternate ones of the elongated elements 32 to move toward the substrate 34. The electrical bias is applied between the reflecting and conducting surfaces 36 of the alternate ones of the elongated elements 32 and the conductor 38. The electrical bias results in a height difference of a quarter wavelength $\lambda/4$ of the incident light I between the alternate ones of the elongated elements 32 and non-biased ones of the elongated elements 32. The height difference of the quarter wavelength $\lambda/4$ produces diffracted light including plus one and minus one diffraction orders, $D_{+1}$ and $D_{-1}$. $D_{+1}$ and $D_{-1}$ are considered together as first order light.

FIGS. 3 and 4 depict the grating light valve™ light modulator 30 in the reflection and diffraction modes, respectively. For a deflection of the alternate ones of the elongated elements 32 of less than a quarter wavelength $\lambda/4$, the incident light I both reflects and diffracts producing the reflected light R and the diffracted light including the plus one and minus one diffraction orders, $D_{+1}$ and $D_{-1}$. In other words, by deflecting the alternate ones of the elongated elements less the quarter wavelength $\lambda/4$, the grating light valve™ light modulator 30 produces a variable reflectivity.

In operation, the grating light valve™ light modulator 30 collects the reflected zero order light resulting from the incident light I impinging the grating light valve™ light modulator 30. In this zero order operation, the grating light valve™ light modulator 30 is in a through-state when the elongated elements are in a flat state and the reflected light R is collected, as illustrated in FIG. 3. The through-state is also referred to as an on-state. The reflected light R is also the zero order light. When electrical bias is applied to alternating elongated elements 32, the grating light valve™ light modulator 30 is in a deflected state, as in FIG. 4, and the incident light I is diffracted. In this deflected state, the grating light valve™ light modulator 30 essentially extinguishes any of the incident light I from being reflected. This essentially eliminates any zero order light from being collected while in the deflected state. While in this deflected state, the grating light valve™ light modulator is also referred to as being in an off-state. Any portion of the incident light I that impinges the grating light valve™ light modulator 30 while in the off-state and is not diffracted will be collected as zero order light, thereby reducing contrast. To achieve optimal contrast, the incident light I is either completely specularly reflected (in the on-state), or completely diffracted (in the off-state). Any variation from this will reduce contrast.

The present invention designs and engineers the gaps g to achieve contrast ratios of 30–40 dB and higher. Once the gaps g reach the scale of the wavelength $\lambda$ and below, $g \leq \lambda$, the incident light I will inevitably be affected. For telecommunication applications, the wavelength $\lambda$ is preferably about 1.55 $\mu$m and the gap g is preferably about 0.5 $\mu$m. Incident light I that impinges a gap g larger than the wavelength I can remain unaffected. When working with parts per thousand, as in high-contrast operation, this unaffected light negatively impacts the contrast.

The modulator of the present invention can be applied to any optical switching applications, as well as to displays. Optics for this type of modulator are easier and cheaper to produce than modulators using conventional grating light valve™ light modulators and collecting first order light. Also, the efficiency of the present invention is improved, and polarization dependent loss (PDL) effects are typically lower in zero order operation.

By collecting the zero order light, efficiency of the modulator of the present invention is improved relative to collecting the first order light. In an optimal case where gap g=0, a maximum efficiency associated with first order operation is 81% and a maximum efficiency associated with zero order operation is 100%. While collecting light of a diffracted state, as in first order light, there is inevitably light in the higher orders. The diffracted light may not be only in the first order. Therefore, when collecting first order light, there may also be uncollected light at the higher orders. This higher order light may be wasted thereby limiting the first order operation to maximum efficiency of 81%. In contrast, zero order operation collects light in a mirror state so ideally there is no diffraction. With no diffraction, and therefore no higher orders of light, all of the light is collected as zero order light. So as the gap g approaches zero, the zero order operation efficiency approaches 100%.

The size of the gap g also impacts the efficiency of the modulator. As the size of the gap g is reduced, efficiency improves which also increases the contrast. This is a result of the fill factor, which represents the percentage of the grating light valve™ light modulator that effects impinging light. The fill factor is represented as:

fill factor=$w/(w+g)$ where w is the width of the elongated element. In scalar theory, efficiency of the zero order operation is proportional to (fill factor)$^2$. Ideally, the gap g=0 and the fill factor is 1.00, or 100%. With a fill factor of 1.00, all of the impinging light is affected. The impact of the fill factor relates to the previous discussions regarding the portion of the incident light I that passes through the gap g. Whether the incident light I is affected when passing through the gap g, as in FIGS. 1 and 2, or unaffected, as in FIGS. 3 and 4, the portion of the incident light I that passes through the gap g is not collected while the grating light valve™ light modulator is in the through-state. By losing this portion of the incident light I, efficiency is reduced and contrast is lowered. As the gap g is reduced, the fill factor increases and efficiency is improved. Since the present invention reduces the gap g to $g \leq \lambda$, the efficiency of the of the modulator of the present invention is improved over conventional modulators.

There is also strong motivation for using zero order operation in an optical train because it is much easier optically. It is well known in the art of optics that is easier working on-axis, or parallel to the optical axis, as in zero order light, versus working at an angle to the optical axis, as in first order light. Conventionally, first order light is collected using Schlieren optics, which is discussed in greater detail below. In zero order operation, the Schlieren optics are substantially easier to design and more efficient in their results.

Contrast can be set in great part by two factors. The first factor is the distance that the alternating elongated elements are deflected. Maximum contrast as influenced by this first factor is obtained when the elongated elements are deflected $\lambda/4$. In the off-state of the present invention, the distance $\lambda/4$ causes the reflected light to be essentially extinguished.

Figure 5:
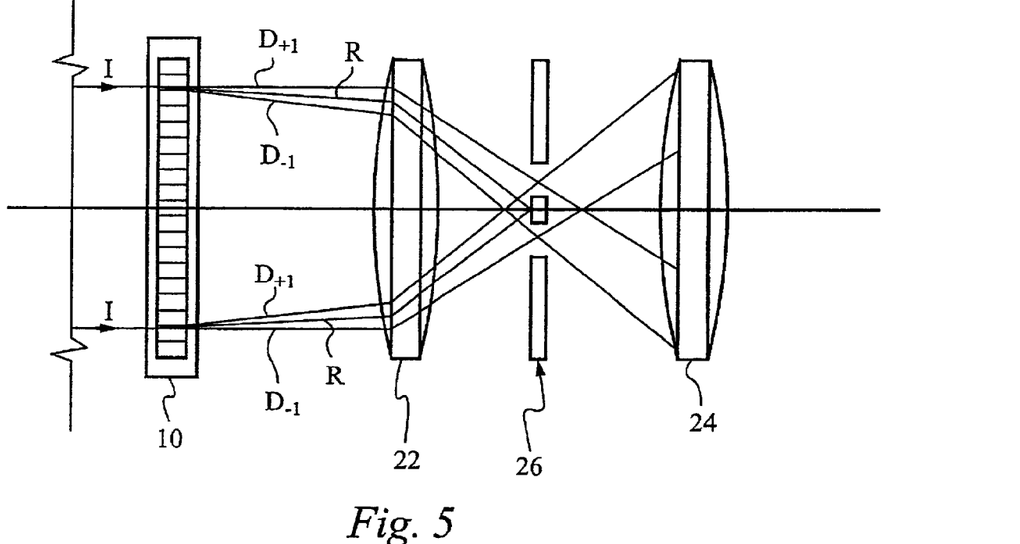
FIG. 5 illustrates an top-down view of an exemplary optical system using first order operation.

The second factor is the architecture of the filter used to collect the light. To better understand the architectural benefits of the present invention, a closer look at the first order operation using a conventional grating light valve™ light modulator is warranted. FIG. 5 illustrates an exemplary top-down view of an optical system using first order operation. This first order optical system includes the grating light valve™ light modulator 10, relay lenses 22 and 24, and a Schlieren aperture 26. The relay lenses 22 and 24 and the Schhieren aperture 26 together are known as Schlieren optics. In operation, an incident light I impinges the grating light valve™ light modulator 10. While in an off-state, the incident light I is reflected off the grating light valve™ light modulator 10 as reflected light R. The reflected light R also includes the zero order light. The reflected light R is relayed by relay lens 22 to the Schlieren aperture 26. The relay lens 22 is configured such that all reflected light R is directed to the center of the Schhleren aperture 26. The Schlieren aperture 26 is configured to pass all first order light and to stop all non-first order light. To accomplish this, the Schlieren aperture 26 includes a stop in its center for stopping zero order light, an opening on either side of the center stop for passing the plus and minus first order light, and a lateral stop on the far side of each opening for stopping second order and higher light. While in an on-state, the incident light I is diffracted off the grating light valve™ light modulator 10 as first order light, $D_{+1}$ and $D_{-1}$, and higher order light, which is not shown in FIG. 5. The first order light passes through the Schlieren aperture 26 to the relay lens 24. The higher order light is stopped by the lateral stops of the Schlieren aperture 26. The relay lens 24 relays the first order light as appropriate, depending on the application.

As previously discussed, the different wavelengths have different diffraction angles. To account for these varying diffraction angles, the openings in the Schlieren aperture 26 must be large enough to pass the entire wavelength band of interest In addition, there must be two openings to account for the plus and minus first order light. These larger openings reduce efficiency and, therefore, lower contrast. Also, overlapping of the higher order light with the first order light must be prevented. Specifically, due to the varying diffraction angles of the different wavelengths, the optical system illustrated in FIG. 5 must have sufficient discrimination among zero and first order diffraction at all wavelengths. This increases the complexity of such an optical system.

Figure 6:
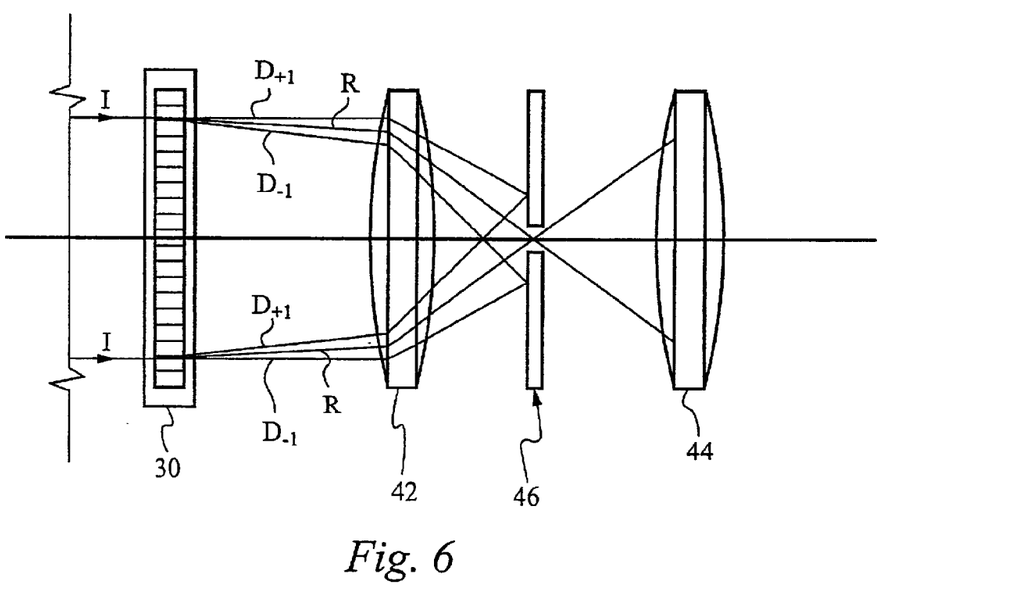
FIG. 6 illustrates a top-down view of an optical system using zero order operation according to the preferred embodiment of the present invention.

FIG. 6 illustrates a top-down view of an optical system using zero order operation according to the preferred embodiment of the present invention. This zero order optical system includes the grating light valve™ light modulator 30, relay lenses 42 and 44, and a Schlieren aperture 46. In operation, an incident light I impinges the grating light valve™ light modulator 30. While in an on-state, the incident light I is reflected off the grating light valve™ light modulator 30 as reflected light R. The reflected light R is also the zero order light. The reflected light R is relayed by relay lens 42 to the Schlieren aperture 46. The relay lens 42 is configured such that all reflected light R is directed to the center of the Schlieren aperture 46. The Schlieren aperture 46 is configured to pass all zero order light and to stop all non-zero order light. To accomplish this, the Schlieren aperture 46 includes a center opening for passing the zero order light and a lateral stop on either side of the center opening for stopping all non-zero order light. While in an off-state, the incident light I is diffracted off the grating light valve™ light modulator 30 as first order light, $D_{+1}$ and $D_{-1}$, and higher order light (not shown). The non-zero order light is stopped by the lateral stops of the Schlieren aperture 46.

The zero order light passes through the Schhieren aperture 46 to the relay lens 44. The relay lens 44 relays the zero order light as appropriate, depending on the application. Although FIG. 6 only shows the zero order light reaching the relay lens 44, the zero order light can be further directed to a display, an optical fiber, a thermal printer, or any other appropriate application using any combination of lenses, waveguides or other optical means for directing light.

Unlike first order light, different wavelengths in zero order light do not have varying diffraction angles. Since the zero order light is reflected in a specular fashion and there is no diffraction, all wavelengths are perfectly superimposed. This greatly reduces the size of the center opening of the Schlieren aperture 46. Using a smaller combiner with a single opening is desirable for higher contrast, and it is easier to design optically. Therefore, the combiner used in zero order operation significantly improves efficiency over first order operation, which results in greater contrast.

Figure 7:
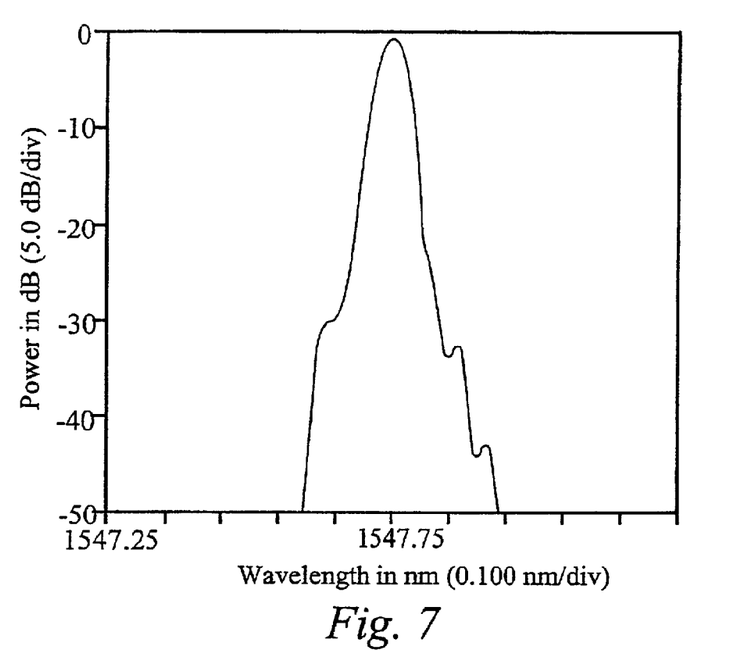
FIG. 7 illustrates collected zero order light where the grating light valve™ light modulator of the present invention is in the on-state.
Figure 8:
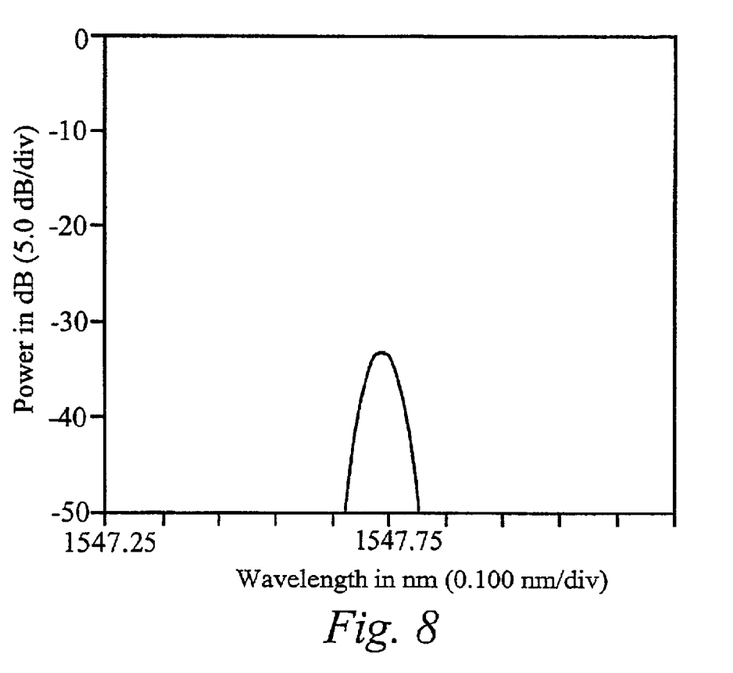
FIG. 8 illustrates collected zero order light where the grating light valve™ light modulator of the present invention is in the off-state.

FIGS. 7 and 8 illustrate the collected zero order light for a telecommunications application where the grating light valve™ light modulator of the present invention is in the on-state and the off-state, respectively. The incident light for the measurements indicated in FIGS. 7 and 8 is 1547.72 nm and the grating light structure has 8 um wide elongated elements with 0.625 um wide gaps between the elongated elements. Thus the gaps are only 0.4 wavelengths wide and tend to only diffract into second order or otherwise scatter, producing a negligible level of specular reflection. Narrowing the gaps and increasing the widths of the elongated elements has the additional benefits of reducing the fraction of light incident to the grating light valve™ light modulator that interacts directly with the gaps. In other words, the fill factor is improved. This also tends to enhance contrast, so long as an adequate first order diffraction angle is maintained. The curves illustrated in FIGS. 7 and 8 clearly demonstrate that 30 dB of on-off contrast can be attained when operating a grating light valve™ light modulator-based switch in zero order operation with a gap between elongated elements equal to 0.4 wavelengths of the incident light. By reducing the gap size to 0.4 um, 35–40 dB of on-off contrast has been achieved. Further refinements on the gap, the sacrificial layer, the cover glass (and its coating) of the grating light valve™ light modulator should permit single-pass contrasts of greater than 40 dB.

The 1547.72 nm wavelength of the incident light is consistent with telecommunications applications. The use of the present invention also has an application in display devices. However, the gap must be reduced by a factor of three since the wavelength of visible light, approximately 0.5 um, is a factor of three smaller than the wavelength used in telecommunications. Irrespective of the particular application, the same principles apply.

The present invention has been described in terms of specific embodiments incorporating details to facilitate the understanding of the principles of construction and operation of the invention. Such reference herein to specific embodiments and details thereof is not intended to limit the scope of the claims appended hereto.

We claim:

1. A light modulator for modulating an incident light beam comprising a plurality of elements selectively operable in a first mode and a second mode, wherein a gap between adjacent elements is equal to or less than a wavelength of the incident light beam, where the plurality of elements in the first mode reflects light along a return path, where the plurality of elements in the second mode directs light both along and away from the return path, whereby modulation of the incident light beam is performed by collecting zero order light along the return path.

2. The light modulator of claim 1 wherein each element includes a light reflective planar surface and the light reflective planar surfaces of the elements lie in one or more parallel planes.

3. The light modulator of claim 2 wherein the first mode comprises a reflection mode in which the plurality of elements reflect the incident light beam as a plane mirror, and the second mode comprises a diffraction mode in which the plurality of elements diffract the incident light beam.

4. The light modulator of claim 2 further comprising a support structure coupled to the plurality of elements to maintain a position of each of the plurality of elements relative to each other and to enable movement of one or more of the plurality of elements in a direction normal to the one or more parallel planes of the plurality of elements.

5. The light modulator of claim 2 wherein in the diffractive mode the plurality of elements comprise a first group of elongated elements interdigitated with a second group of elongated elements, further wherein a height difference between the first elongated elements and the second elongated elements causes the incident light beam to diffract away from the return path.

6. The light modulator of claim 1 wherein the gap between adjacent elements is equal to or less than one-half the wavelength of the incident light beam.

7. The light modulator of claim 1 wherein the light modulator comprises a diffractive light modulator.

8. An optical system for providing high-contrast operation by collecting zero order light, the optical system comprising:
   a. a light modulator including a plurality of elements selectively operable in a first mode and a second mode, wherein a gap between adjacent elements is equal to or less than a wavelength of an incident light beam, where the plurality of elements in the first mode reflects light along a return path, where the plurality of elements in the second mode directs light both along and away from the return path; and
   b. a collector coupled to the light modulator to collect zero order light along the return path while the plurality of elements are in the first mode and to collect zero order light along the return path while the plurality of elements are in the second mode.

9. The optical system of claim 8 wherein the collector includes Schlieren optics to pass the zero order light.

10. The optical system of claim 9 wherein the collector includes an optical train coupled to the Schlieren optics to direct the zero order light to an optical fiber.

11. The optical system of claim 9 wherein the collector includes an optical train coupled to the Schlieren optics to direct the zero order light to a display device.

12. The optical system of claim 9 wherein the collector includes an optical train coupled to the Schlieren optics to direct the zero order light to a thermal printer.

13. The optical system of claim 8 wherein the light modulator comprises a diffractive light modulator.

14. The optical system of claim 13 wherein the first mode comprises a reflection mode in which the plurality of elements reflect the incident light beam as a plane mirror.

15. The optical system of claim 13 wherein the second mode comprises a diffraction mode in which the plurality of elements comprise a first group of elongated elements interdigitated with a second group of elongated elements, further wherein a height difference between the first elongated elements and the second elongated elements causes the incident light beam to diffract away from the return path.

16. The optical system of claim 15 wherein the plurality of elements comprise elongated elements arranged parallel to each other and further wherein each elongated element comprises a reflective surface and a flexible material.

17. The optical system of claim 8 wherein the gap between adjacent elements is equal to or less than one-half the wavelength of the incident light beam.

18. An optical system for providing high-contrast operation by collecting zero order light, the optical system comprising:
   a. means for collecting zero order light along a return path; and
   b. means for modulating an incident light beam comprising a plurality of elements selectively operable in a first mode and a second mode, wherein
      a gap between adjacent elements is equal to or less than a wavelength of an incident light beam, where the plurality of elements in the first mode reflects light along the return path, where the plurality of elements in the second mode directs light both along and away from the return path.

* * * * *